United States Patent [19]

Jackson

[11] 4,447,323

[45] May 8, 1984

[54] TRASH RAKE WITH RECOVERY GUTTER

[75] Inventor: Philip Jackson, Paris, France

[73] Assignee: E. Beaudrey & Cie, Paris, France

[21] Appl. No.: 329,601

[22] Filed: Dec. 10, 1981

[30] Foreign Application Priority Data

Dec. 11, 1980 [FR] France ............................. 80 26266

[51] Int. Cl.³ .......................................... B01D 35/08
[52] U.S. Cl. .................................... 210/158; 210/159
[58] Field of Search ................ 210/158, 159, 162, 155

[56] References Cited

U.S. PATENT DOCUMENTS

| | | | |
|---|---|---|---|
| 2,804,209 | 8/1957 | Carlton et al. | 210/158 |
| 3,755,846 | 9/1973 | Sandler | 210/158 |
| 3,868,324 | 2/1975 | Taylor et al. | 210/158 |

FOREIGN PATENT DOCUMENTS 2076396 10/1971 France .

OTHER PUBLICATIONS

Civil Engineering, Jun. 1975, vol. 45, No. 6, p. 18.

Wastewater Engineering, 1979, Metcalf & Eddy, Inc., Second Edition, pp. 182–185.

*Primary Examiner*—Benoît Castel
*Assistant Examiner*—Wanda L. Millard
*Attorney, Agent, or Firm*—Charles E. Brown

[57] ABSTRACT

A trash rake is disclosed for cleaning the bars of a water intake bar screen. A carriage carrying a pan is mounted for movement parallel to the bar screen. Along the transverse edge of the pan proximate to the screen is a rake member whose teeth are received between adjacent bars during one direction of displacement of the carriage. A watertight recovery gutter for collecting foreign bodies, including living creatures, is arranged in continuity with the rake member and maintains the foreign bodies in water during the ascent of the pan. Preferably, the recovery gutter has a trapezoidal cross section and a transverse wall portion running directly into the rake member which makes an angle of at least 30° with a horizontal plane when the rake member engages the bar screen.

8 Claims, 3 Drawing Figures

TRASH RAKE WITH RECOVERY GUTTER

The present invention relates generally to trash rakes commonly used for cleaning the bars of bar screens for water intakes, in particular water intakes for supplying water to industrial plants or installations, for example, for cooling purposes.

As is known water intakes for sea water or fresh water are usually equipped upstream of the actual water screen and transversely with respect to the flow of water with vertical or inclined bar screens. The bars are arranged in vertical planes and are spaced at a distance of several millimeters to several centimeters from one another and are designed to hold back the biggest foreign bodies or refuse.

Among such foreign bodies held back by the bar screens are living creatures such a crustaceans and fish which, entrained by the flow of water and thrust against the bars of the bar screen, do not have sufficient energy to extricate themselves from the bars, for example, by swimming countercurrent.

Trash rakes are usually associated with such bar screens for removing such foreign bodies which gradually accumulate. Such a trash rake generally comprises a carriage mounted for movement along a track arranged parallel to the plane of the bar screen and upstream thereof. A pan is carried by the carriage and extends transversely relative to the track. The pan has on its edge closest to the bar screen a toothed or rake member, the teeth of which are received between adjacent bars in at least one direction of displacement of the carriage.

Such a trash rake is mechanically or automatically operated either at regular intervals or in response to a loss of head across the bar screen exceeding a predetermined value.

In the course of cleaning the bar screen which is carried out from the bottom to the top of the bar screen, the rake member removes the foreign bodies thrust against and between the bars of the bar screen. A collector or recovery member is associated with the rake member and in continuity therewith, and is adapted to collect the foreign bodies from the bar screen and carry them away upwardly.

At the top of the trash rake the foreign bodies lifted by the pans are dumped into a discharge trough. To this end, the pans are either pivotally mounted on their carriages or associated with a mechanical scraping means for dumping the other foreign bodies into the trough. The trough is continuously supplied with water of flushed out periodically to carry away the foreign bodies. For the reasons already brought out above, living creatures are subjected to the very same treatment. During the latter part of the upward movement of the pans along the bar screen, the foreign bodies including living creatures, are out of the water for a variable period of time particularly when the water intake is installed at the sea subjected to great tidal ranges or waterways subjected to flooding.

It is all the more so since typical present-day trash rakes have recovery or collector members which are not watertight and are incapable of preventing water from leaking out.

On the contrary, it has generally been considered up to the present day that such recovery members should not be watertight in order to drain out the water during the ascent of recovery member, to reduce the total load carried by the recovery members, and to prevent overflowing water from accidentally carrying along with it some of the foreign bodies.

It is known that merely taking such living creatures out of the water for a period of more than a few minutes may be fatal. Moreover, while such living creatures are out of the water their flapping around may cause injuries resulting in their death. Finally, in the course of their being dumped into the discharge trough without any special precautions they are very often injured. In short, with present-day trash rakes, the living creatures picked up by the rake member are inevitably injured or killed.

A general object of the invention is to provide a trash rake which protects living creatures.

According to the invention there is provided a trash rake for cleaning a bar screen of a water intake. A carriage is movably mounted along a track arranged parallel to the plane of the bar screen and upstream thereof relative to flow of water therethrough. A pan is carried by the carriage and extends transversely to the track. The pan has on its edge proximate to the bar screen a rake member, the teeth of which are adapted to be received between the adjacent bars of the bar screen in at least one direction of displacement of the carriage. A recovery member associated with the carriage and in continuity with the rake member is adapted to collect foreign bodies removed from the bar screen. The trash rake is characterized by the recovery member defining watertight gutter means for collecting foreign bodies removed from the bar screen, namely living creatures.

Thus the living creatures picked up by the pan of the trash rake are not emersed during the ascent of the pan regardless of the period of ascent.

Preferably, the recovery gutter comprises a transverse wall in continuity with the rake member, characterized in that when the teeth of the rake member are received between the bars of the bar screen the angle of inclination with respect to a horizontal plane of at least the portion of the transverse wall running directly into the rake member is at least 30°.

Further, there is preferably provided a discharge trough at the top end of the track and extending transversely thereto for receiving the foreign bodies removed by the rake member. Means are provided for constantly maintaining the water in the trough at a constant level.

According to a preferred embodiment the water level is sufficient so that when the foreign bodies are dumped into the discharge trough, the living creatures are not injured since they are accompanied by the water in the pan.

Thus, owing to the invention the lives of such living creatures which may be picked up by the pan of a trash rake are protected and they may return to their natural habitat.

These and other features and advantages of the invention will now be brought out in the description which follows, given by way of example, with reference to the accompanying schematic drawings, in which.

Figure 1:
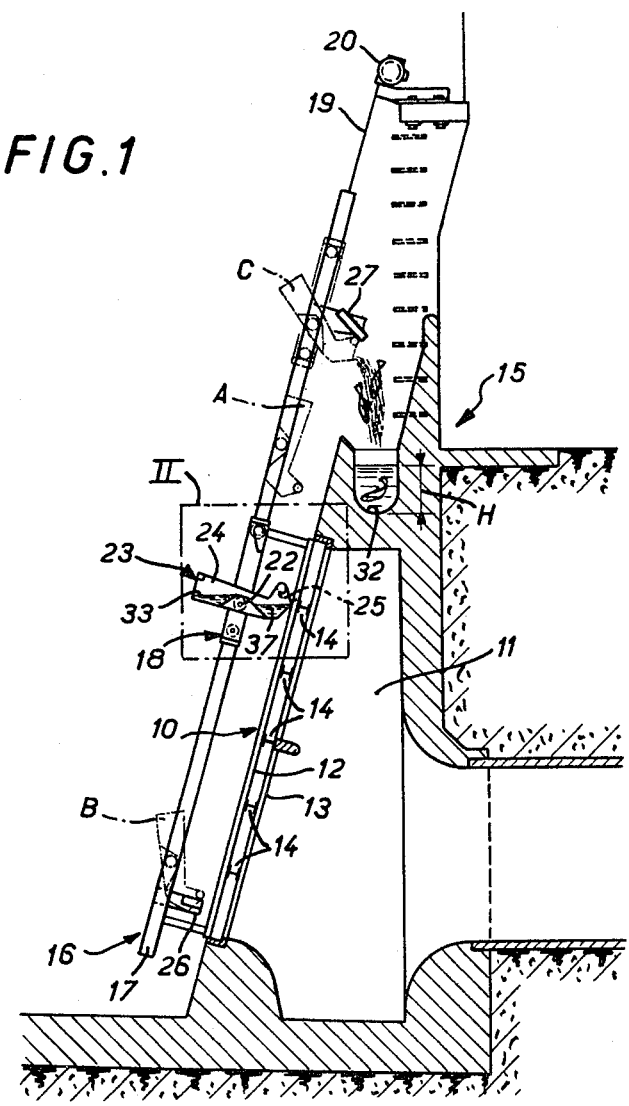
FIG. 1 is a vertical sectional view of a water intake with a trash rake embodying the invention.

The drawings illustrate a water intake with a trash rake generally of the type disclosed in French printed patent application No. 2,076,396.

Such a trash rake is adapted to clean a bar screen 10 which transversely protects the inlet of the water intake 11 and is slightly inclined relative to a vertical plane in the illustrated embodiment. The bars 12 of the bar screen 10 are arranged in vertical planes spaced from one another by a distance of a few centimeters. The bars 12 are supported by a frame comprising longitudinal members or beams 13 and cross members 14 mounted in a concrete masonry structure 15.

The trash rake has a track 16 arranged parallel to the plane of the bar screen 10 and upstream thereof, comprising two spaced beams 17 (only one of which is shown) suitably braced. A carriage 18 is mounted for movement along the track 16 by means of a cable 19 attached at its upper end to a hoist 20.

A pan 23 is pivotally mounted on the carriage 18 about a pivot 22, the pan extending transversely with respect to the track 16. The pan 23 has sidewalls 24, at least one of the sidewalls having a roller 25 selectively cooperable with two abutments 26, 27 fixed to the track 16 respectively at the upper and lower ends thereof.

When the carriage 18 descends the track 16, it is in a retracted position as shown in phantom lines at A in FIG. 1, extending substantially parallel to the plane of the bar screen 10. When the carriage reaches the bottom of the track 16, the roller 25 on the pan 23 engages abutment 26 thereby swinging the pan into its operative position about pivot 22 as schematically illustrated in phantom lines at B in FIG. 1.

Figure 2:
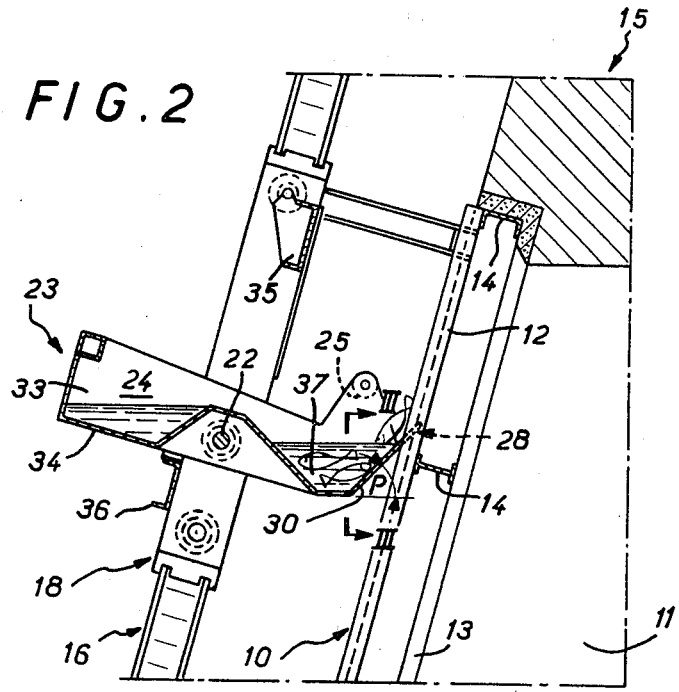
FIG. 2 is an enlarged view of the area included within the phantom line zone II in FIG. 1.
Figure 3:
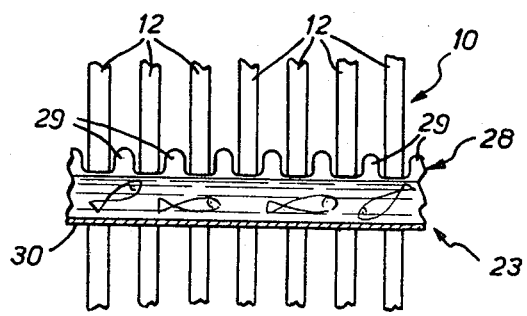
FIG. 3 is a fragmentary cross-sectional view of the recovery gutter of such a trash rake, taken along line III—III in FIG. 2.

Thereafter, during the ascent of the carriage 18 along the track 16, the pan 23 is in its operative position as shown in solid lines in FIGS. 1 and 2, extending substantially at right angles to the bar screen 10. When the carriage 18 reaches the top of the track 16, its roller 25 engages abutment 27 thereby swinging the pan 23 in the opposite direction about its pivot 22 back to its retracted position, as schematically illustrated at C in FIG. 1.

Along the edge of the pan extending between the sidewalls 24 and proximate to the bar screen there is provided a rake member 28 having teeth 29 engageable between adjacent bars 12 of the bar screen 10 during at least one direction of displacement of the carriage 18, here the ascent; during the descent the pan 23 is in a retracted position, as explained above.

Moreover, during the upward movement of the carriage 18, the rake member 28 removes foreign bodies which may have collected on the bar screen 10, whether they are inert refuse or living creatures from the biomass.

The rake member 28 is associated with a recovery member which is also part of the pan 23. The recovery member is arranged in continuity with the rake member 28 and is adapted to collect foreign bodies removed from the bar screen 10 by the rake member 28.

According to a preferred embodiment the recovery member comprises a transverse wall 30 of the pan 23 interconnecting the sidewalls 24 and extending generally transversely to the bar screen 10 in the operative position.

When the pan 23 is tipped over at the upper end of the track, the foreign bodies collected in the recovery member of the pan 23 are dropped into the discharge trough 32 provided in the concrete masonry structure 15 above the bar screen 10 and extending transversely to the track 16.

The back of the pan 23, remote from the bar screen 10, forms a channel or cup 33 which is filled with a predetermined quantity of water during the upward movement of the carriage 18. The channel or cup 33 thus acts as a counterweight; its water washes the teeth 29 of the rake member 28 when the pan 23 is tipped over by the upper abutment 27.

The cup or channel 33 is, in practice, formed by another transverse wall 34 extending transversely between the sidewalls 24 of the pan 23. The other transverse wall 34 may, as illustrated, be in continuity with transverse wall 30 forming the recovery member.

The configuration and arrangement of the pan 23, bearing in mind the weight carried and the center of gravity relative to the pivot 22, are such that the retracted and operative positions are ensured by gravity.

Preferably, in its retracted position the pan 23 bears against a first, upper cross member 35 of the carriage 18 to one side of the pivot 22 and in its operative position it bears against second, lower cross member 35 to the other side of the pivot 22.

These arrangements are well known per se and are described in detail in the above-mentioned French printed patent application No. 2,076,396 and therefore need not be further described herein.

In the French printed patent application, the transverse wall 30 defining the recovery member is in continuity with the rake member 28. In the operative position of the recovery member the teeth 29 of the rake member 28 are received between the bars 12 of the bar screen 10, and the said transverse wall 30 of the recovery member lies in a substantially horizontal plane.

On the contrary, according to the invention, the recovery member defines a recovery gutter 37.

In the preferred embodiment, the recovery gutter 37 is of trapezoidal cross section. But this is not necessarily so, the cross section may be triangular or even semicircular.

In any event, in the operative position of the rake member 28, the angle of inclination of at least the portion of the transverse wall 30 immediately adjacent and running directly into the rake member 28, without any space therebetween, defines a not insubstantial angle P relative to the horizontal direction. Preferably, this angle is at least 30°. It may, however, reach a value close to 45° as shown.

Further, the recovery gutter 37 which comprises sidewalls 24 of the pan 23 and the transverse wall 30 is watertight.

It follows from the foregoing that the recovery gutter 37 is capable of maintaining in water the foreign bodies, namely living creatures, collected at the bar screen 10 by the rake member 28 during the entire upward path of movement of the carriage 18 along the track 16 including the emersed portion of the path.

Further, the discharge trough 32 into which the foreign bodies are dumped, from the recovery gutter 37 at the top of the track, is constantly maintained at a predetermined water level H. As is known per se, but not shown, the constant predetermined water level may be maintained by a constant supply of water into discharge trough 32 in combination with an overflow shoot.

In any event the living creatures dropped into the discharge trough 32 find conditions suited for their survival. They are then able to return to their natural habitat.

The invention is not intended to be limited to the illustrated and described embodiment but rather encompasses various alternatives and modifications which will be apparent to those skilled in the art, without departing from the scope of the invention defined by the appended claims.

Further, use of the invention is not limited to trash rakes provided with pivoted pans or in which the pivoted pans have cups or channels forming counterweights, but includes any type of pan. For example, the pan may have a fixed orientation and be associated at the top of the track with a scraper with a flexible blade, for example, adapted to sweep out the foreign bodies from the recovery gutter.

Likewise, the present trash rake may be used with any stationary bar screen, whether it is inclined, vertical, flat or curved.

What I claim is:

1. A trash rake for cleaning a bar screen of a water intake, said trash rake comprising a carriage mounted for movement along a track arranged parallel to and upstream of the bar screen, said carriage carrying a pan extending transversely to said track, said pan having a rake member along its transverse edge proximate to the bar screen, said rake member having teeth shaped and arranged to be received between adjacent bars of the bar screen for removing foreign bodies therefrom during displacement of said carriage in at least one direction, a recovery member associated and in continuity with said rake member for collecting foreign bodies removed by said rake member, the improvement wherein said recovery member defines a watertight gutter means for maintaining collected foreign bodies, including living creatures, in water during displacement in said one direction even when said recovery member is emersed, said pan member is mounted on a pivot disposed generally parallel to said bar screen with said recovery member being immediately adjacent said rake member for positioning between said pivot and said bar screen.

2. The trash rake of claim 1, said recovery member comprising a transverse wall lying in continuity with said rake member, wherein when said teeth of said rake member are received between the bars of the bar screen, the angle of upward inclination with respect to a horizontal plane of at least a portion of the transverse wall running upwardly and directly into said rake member is at least 30°.

3. The trash rake of claim 2, wherein said recovery member has a trapezoidal transverse cross section.

4. The trash rake of claim 1 wherein a discharge trough is arranged above the bar screen for receiving foreign bodies collected by said recovery member, further comprising means for constantly maintaining a predetermined level of water in the discharge trough.

5. The trash rake of claim 1, wherein a transverse wall portion of said recovery member interconnects spaced sidewalls of said pan and lies in the continuation of said rake member.

6. The trash rake of claim 1, wherein said recovery member is pivotally mounted on said carriage between a first or operative position in which the teeth of the rake member are received between the adjacent bars of the bar screen and a second or discharge position for tipping the collected foreign bodies from the pan, and a stop engageable with said pan for tilting the latter from its first position to its second position.

7. The trash rake of claim 1, wherein said recovery member has a trapezoidal transverse cross section.

8. The trash rake of claim 1, wherein said carriage is mounted for reciprocating movement on said track.

* * * * *